No. 612,698. Patented Oct. 18, 1898.
O. B. BOLTON.
BANDSAW GRINDER.
(Application filed Apr. 5, 1898.)

(No Model.) 4 Sheets—Sheet 1.

WITNESSES:

INVENTOR

Orrin B. Bolton

By Moulton & Flanders

Attorneys

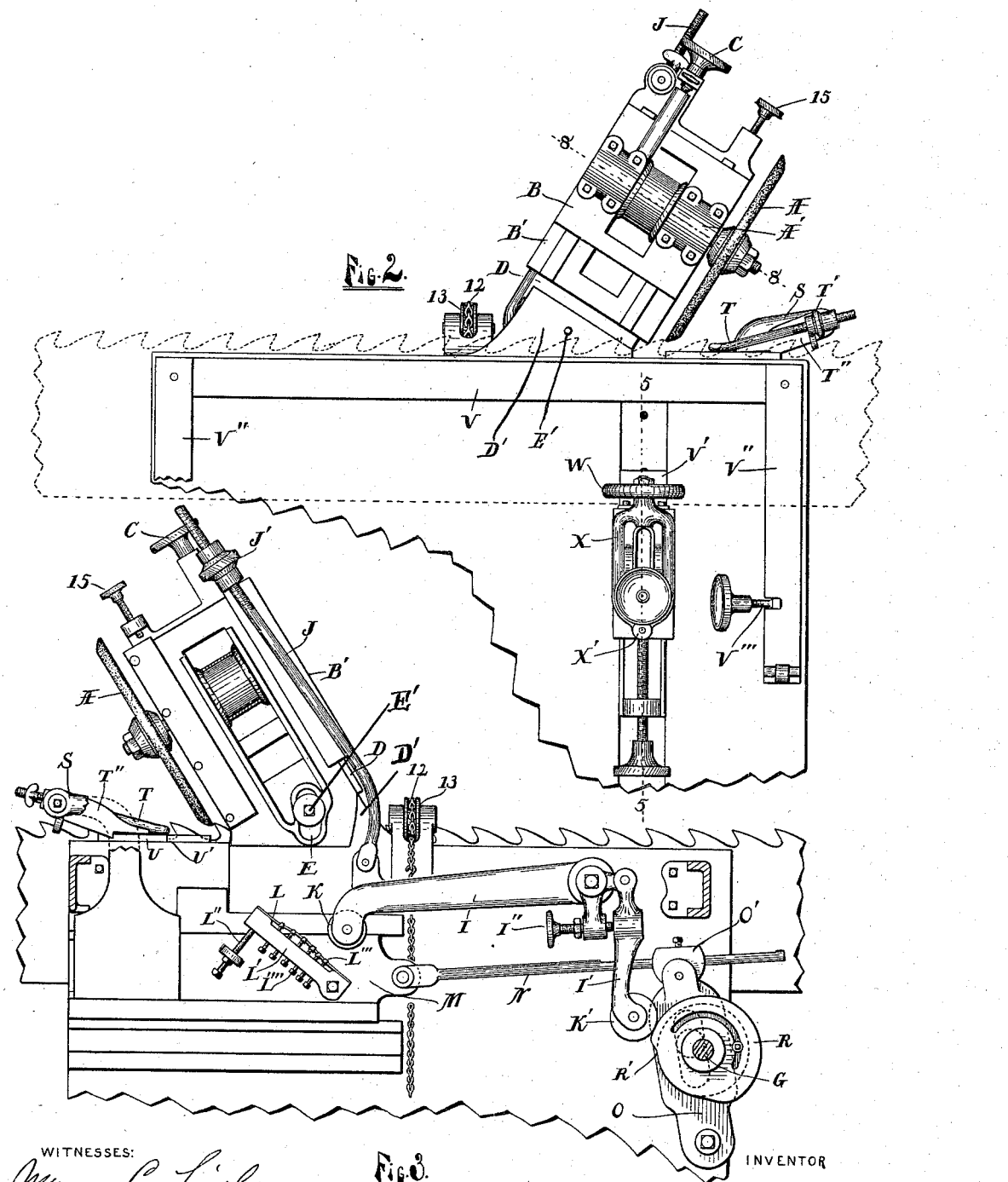

No. 612,698. Patented Oct. 18, 1898.
O. B. BOLTON.
BANDSAW GRINDER.
(Application filed Apr. 5, 1898.)

(No Model.) 4 Sheets—Sheet 4.

WITNESSES:
Myron C. Lisle,
Palmer R. Jones.

INVENTOR
Orrin B. Bolton
By
Moulton & Flanders
Attorneys.

UNITED STATES PATENT OFFICE.

ORRIN B. BOLTON, OF GRAND RAPIDS, MICHIGAN, ASSIGNOR OF THREE-FOURTHS TO FRANK A. BALDWIN AND VICTOR M. TUTHILL, OF SAME PLACE, AND MARK D. BALDWIN, OF KALISPELL, MONTANA.

BANDSAW-GRINDER.

SPECIFICATION forming part of Letters Patent No. 612,698, dated October 18, 1898.

Application filed April 5, 1898. Serial No. 676,524. (No model.)

*To all whom it may concern:*

Be it known that I, ORRIN B. BOLTON, a citizen of the United States, residing at Grand Rapids, in the county of Kent and State of Michigan, have invented certain new and useful Improvements in Bandsaw-Grinders; and I do hereby declare the following to be a full, clear, and exact description of the invention, such as will enable others skilled in the art to which it appertains to make and use the same.

My invention relates to improvements in bandsaw-grinding machines; and its object is to provide the same with improved means for operating the wheel-carriage and the saw to determine the form of the tooth and also with certain other new and useful features, hereinafter more fully described, and particularly pointed out in the claims, reference being had to the accompanying drawings, in which—

Figure 1:
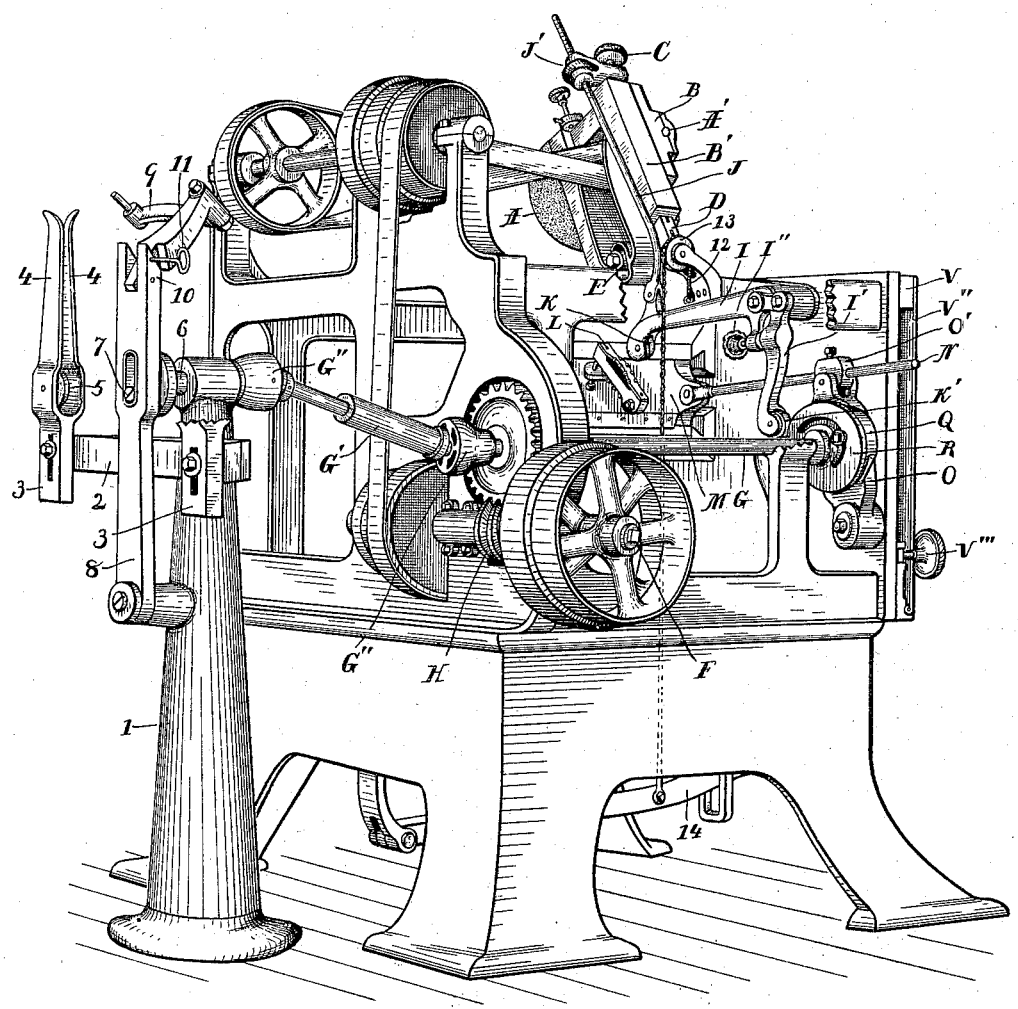
Figure 4:
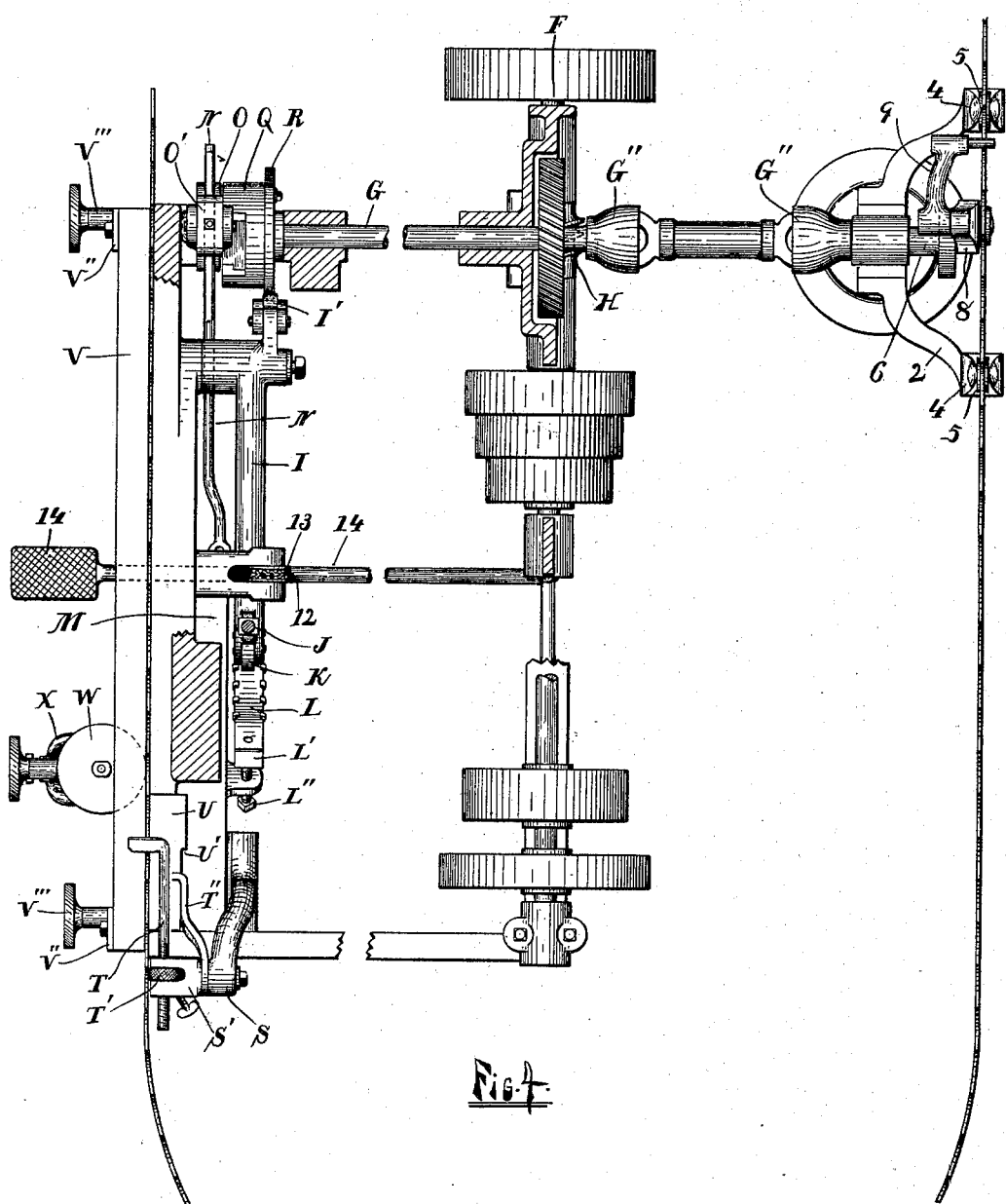
Figure 5:
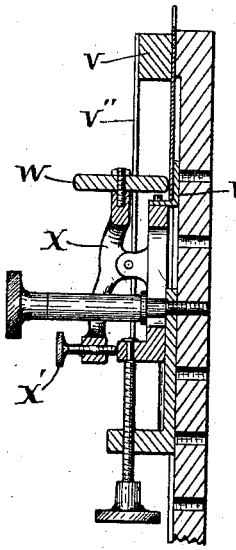
Figure 6:
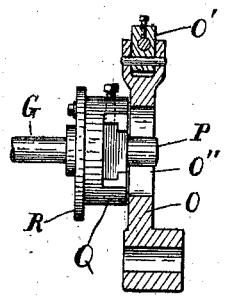
Figure 7:
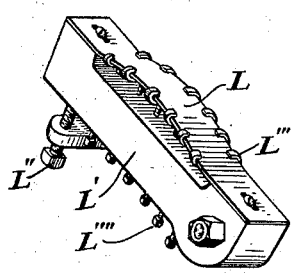
Figure 8:
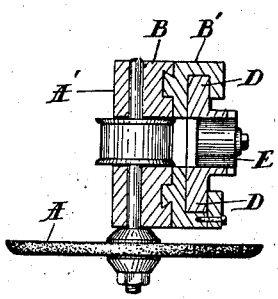
Figure 9:
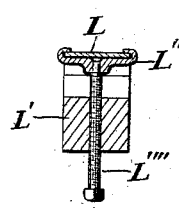
Figure 10:
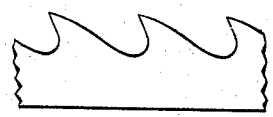
Figure 11:
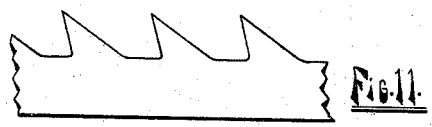

Figure 1 is a perspective of a machine embodying my invention; Fig. 2, a detail in elevation showing the outside view of the wheel-carriage and saw-clamp; Fig. 3, a detail in elevation showing the wheel-carriage from the direction opposite to Fig. 2 and the carriage-operating mechanism; Fig. 4, a detail in plan view of the saw-moving and carriage-operating mechanism; Fig. 5, a detail of the saw-clamp, partially in vertical section, on the line 5 5 of Fig. 2; Fig. 6, a detail of a portion of the carriage-operating mechanism; Fig. 7, an enlarged detail of the adjustable incline, forming part of the carriage-operating mechanism; Fig. 8, a detail of the carriage in cross-section on the line 8 8 of Fig. 2; Fig. 9, a transverse section of the part shown in Fig. 7; Fig. 10, a diagram of saw-teeth with curved outline, and Fig. 11 the same of saw-teeth with rectilinear outlines.

Like letters and numerals refer to like parts in all of the figures.

A represents any suitable wheel for grinding the teeth of bandsaws mounted on an arbor A', journaled in a frame B, adjustably mounted on a carriage B', and adjusted by a screw C to compensate for the wear of the wheel, said carriage being slidable on inclined ways D and operated by mechanism hereinafter described, being limited in its downward movement by an adjustable stop-screw 15. Said ways are secured to an upwardly-extended portion D' of the frame of the machine and adjustably inclined to conform to the inclination of the forward side of the saw-teeth by means of a binding-bolt E', adjustable in a slot E in said ways, which slot is curved on a radius concentric to the point of contact of the wheel A with the saw, whereby such contact is not changed, except as to the angle by such adjustment. The arbor A' is driven by the usual counter-shaft, belts, and pulleys from the driving-shaft F, which shaft also drives a shaft G, by means of worm-gearing H, to actuate the mechanism for moving the saw and operating the carriage to cause the wheel to properly traverse the respective outlines of the teeth.

To operate the carriage, I provide a bell-crank lever I, having its horizontal arm adjustably connected to the carriage B' by a rod J and adjusting-nut J' and having a roll K at its movable end to engage and traverse an adjustable flexible incline L, mounted on a reciprocating slide M, actuated by a connecting-rod N, adjustably connected to the moving end of the pivoted arm O by a block O', pivotally connected to one end of said arm, the other end of which arm is pivoted to the frame. Said arm is also provided with a longitudinal slot O'', traversed by a crank-pin P, radially adjustable in a head Q on the end of the shaft G. The vertical arm I' of the bell-crank lever is pivoted at its upper end to the horizontal arm and its angle thereto adjustable by means of a set-screw I'' and provided with a roll K' to engage a cam R, rotatively adjustable about the axis of the shaft G by means of a curved slot in the cam and a screw passing through the same and into the head Q. Said cam is provided with an eccentric face throughout a portion of its circumference and a reduction of its diameter, as at R', adapted to give the motion to the lever I, hereinafter described. The slide M is provided with an arm S, to which is pivoted a head S', from which head projects a pawl T, longitudinally adjustable therein by means of the nut T' to engage the teeth of the saw to move the same forward. Pivoted to said arm is a stop T″, engaging a shoulder U′ on the block U at the termination of the stroke. To determine the form of the incline L at pleasure, its ends are slidably secured to the ends of a block L′, said block being pivoted to the slide at one end and vertically adjustable at the other end by means of a screw L″ and intermediately engaged at intervals by clips L‴, embracing its edges and extending beneath the same, each clip being adjusted by means of a screw L⁗, rotatively attached to the clip and passing through a threaded opening in the block L′. By these clips and screws I am able to make the incline of greater or less curvature in parts or to make it concave in part and convex in part at pleasure. The saw slides forward under the wheel A between the frame and a clamp, which clamp consists of a bar V, of wood, attached to the upper ends of springs V″, the lower ends of which are hinged to the frame, said springs being detachably clamped in place by hinged thumb-nut bolts V‴, engaging recesses in the side of said springs, whereby said bolts may be slackened and swung out of engagement with the springs and the clamp opened to remove the saw. Said saw rests upon an angle-plate V′, against the vertical side of which plate the saw is pressed by a horizontal roll W, journaled on the upper end of a pivoted arm X, having a screw adjustment X′ to press said roll against the saw.

To support and feed forward the portion of the saw opposite that operated upon by the wheel, I provide a post 1 outside the machine proper and having a transverse arm 2, having at each end vertically-adjustable supports 3 3, divided vertically, forming flexible arms 4 to support the saw, between which arms the saw is inserted, and rolls 5 between said arms, on which the back of the saw rides. To move the saw forward therein, I provide a short shaft 6, journaled in the top of the post 1 and connected to the shaft G by a telescopic extension G′ and universal-joint couplings G″ G″. On the end of said shaft 6 is a crank-pin 7, which engages a slot in a lever 8, the lower end of which lever is pivoted to the post 1 and having its upper end provided with a pawl 9 to engage the teeth of the saw and move the saw forward. A joint 10 is provided in said lever, whereby the upper end thereof may be swung from the saw to carry the pawl out of the way when the saw is to be removed. The upper portion of the lever is held in line when the pawl is in action by a pin 11, passing through the lever near the joint in the same. A chain 12 is attached to the lever I and extends upward over a pulley 13 and thence downward to a treadle-lever 14, whereby by placing the foot on said treadle the wheel may at any time be raised out of contact with the saw-teeth.

The operation of my device is as follows: Beginning with the parts in position, as in Fig. 3, the shaft G rotates to the right and the cam R engages the bell-crank lever and supports the wheel-carriage, which carriage descends and traverses the wheel along the front side of the saw-tooth as the roll K′ traverses the incline R′. Before the descent is complete the parts are so adjusted that the saw begins to move forward. This forms the concave at the bottom of the tooth. The incline L now engages the roll K, and being properly adjusted will cause the carriage to rise in a proper manner to traverse the curved back of the tooth as the same continues to move forward. As the slide moves back the cam takes the bell-crank lever again and lowers the carriage, as before, preparatory to the repetition of the process on the next tooth. The reciprocation of the carriage moves the pawl T back into engagement with each succeeding saw-tooth, the cam and incline thus acting alternately—the cam as the carriage descends and the incline as it rises. The resistance to such forward movement is somewhat variable and the mechanism might spring more or less under such variation, and thus feed unevenly. To avoid this, the stop T″ is provided, which engages the shoulder U′ slightly before the termination of the stroke, and by its resistance springs the mechanism sufficiently to put considerable tension upon the same. This takes out all variation due to the variable resistance of the saw and brings it accurately to place. For grinding the rectilinear form of teeth shown in Fig. 11 the incline L is made straight and properly adjusted and the parts adjusted to time the beginning of the forward movement of the saw at the time that the wheel reaches the bottom of the tooth and the stop-screw 15 to also come into action at the same time. The wheel now traverses in a straight line, held up by said stop-screw until the incline L takes against the roll K, when the wheel rises regularly as the saw moves forward, the cam lowering the wheel, as before, on the back stroke of the slide. The stroke of said slide is determined for large or small teeth by the radial adjustment of the pin P, which operates, in combination with the lever O and connections, to also give a quick return movement to the said slide. The wheel W, traversing the saw in a horizontal line or slightly upward, has a tendency to hold the same down and prevents the pawl from crowding it upward by its action against the inclined forward side of the tooth. It is obvious that by other adjustments of the parts an indefinite variety of modified forms of teeth may be accurately ground by this machine. By means of the telescopic extension G′ and universal joint G″ the post 1 may be adjustable within certain limits to conform to the size of saw supported and need not be exactly in line to operate freely.

Having thus fully described my invention, what I claim, and wish to secure by Letters Patent, is—

1. In a saw-grinder, in combination with a reciprocating carriage supporting the grinding-wheel, a rotating cam governing its downward movements only and a reciprocating incline governing its upward movement only, and means of transmitting motion from said cam and incline to said carriage, substantially as described.

2. In a saw-grinder, in combination with a reciprocating carriage carrying the grinding-wheel, a lever connected to said carriage, a cam engaging said lever during the descent of the carriage, means for rotating said cam, an incline engaging said lever during the ascent of said carriage, and means for reciprocating said incline substantially as described.

3. In a saw-grinder, adjustable inclined ways, a carriage on said ways and supporting the grinding-wheel, a bell-crank lever connected to said carriage, a rotative shaft, a cam on said shaft engaging one arm of the bell-crank lever during the downward movement of the carriage, an adjustable crank-pin attached to said shaft, a reciprocating slide operated by said pin, an adjustable incline on said slide engaging the other arm of the bell-crank lever during the upward movement of the carriage and a pawl on the slide engaging the saw-teeth substantially as described.

4. In a saw-grinder, in combination with a reciprocating carriage supporting an arbor and grinding-wheel mounted thereon, of inclined ways supporting said carriage and having a slot concentric with the point in the rim of said wheel that contacts the saw and secured by a bolt adjustable in said slot, whereby the position of said contact-point is not changed by changing the inclination of the ways substantially as described.

5. In a saw-grinder, the combination of a reciprocating carriage carrying the grinding-wheel, a bell-crank lever connected to said carriage, a rotative shaft having a rotatively-adjustable cam engaging said lever, and a radially-adjustable crank-pin, a pivoted lever having a slot engaging said crank-pin, a slide operated by said lever, an adjustable incline on said slide to engage said lever, and a pawl on said slide to engage the saw-teeth, substantially as described.

6. In a saw-grinder, in combination with a reciprocating carriage supporting the grinding-wheel, an adjustable stop limiting the descent of the carriage, a rotative cam to permit the descent of the carriage, and a reciprocating incline to raise the carriage, and means for connecting the cam and incline with the carriage, substantially as described.

7. In a saw-grinder in combination with a reciprocating carriage supporting the grinding-wheel, a bell-crank lever having means for adjusting the relative angle of its arms, a cam engaging one arm of said lever and rotatively adjustable on its shaft, a reciprocating slide having an adjustable incline provided with a flexible and adjustable surface engaging the other arm of the lever, and means for reciprocating said slide, substantially as described.

8. In a saw-grinder, in combination with a reciprocating carriage supporting the wheel, and a reciprocating slide, an inclined block pivoted to said slide at one end and supported by an adjusting-screw at the other end, a flexible incline attached to said block, clips embracing the edges of said incline, and adjusting-screws in threaded openings in said block and rotatively attached to said clips, substantially as described.

9. In a saw-grinder, the combination of adjustable inclined ways, a carriage reciprocating on said ways, a lever adjustably connected to said carriage and having an adjustable arm, a rotative shaft having an adjustable cam engaging said lever, and a radially-adjustable crank-pin, a pivoted lever having a slot engaging said crank-pin and a pivoted block in its movable end, a reciprocating slide, a rod adjustably connecting said pivoted block and slide, a block pivoted on said slide and having an adjusting-screw at its movable end, a flexible incline on said block to engage the lever, and screws to bend and hold said incline, substantially as described.

10. In a saw-grinder, a clamp consisting of the frame and a bar, and springs hinged to the frame at one end and attached to the bar at the other end, and bolts hinged to the frame and engaging lateral recesses in said springs, substantially as described.

11. In a saw-grinder, an adjustable post separate from the machine proper, saw-guides and a pivoted arm on said post, said arm having a pawl, a shaft journaled in said post having a crank-pin operating said arm, and flexible telescopic connections between said shaft and the machine proper, substantially as described.

12. In a saw-grinder, guides to support the saw, a pivoted arm between said guides having a joint to swing the pawl laterally away from above the saw, a pawl on said arm to engage the saw and means for reciprocating said arm, substantially as described.

13. In a saw-grinder, a post outside the machine proper, a transverse arm on said post, vertically adjustable and divided guides on the ends of said arms, having rolls; an arm pivoted to said post and having a slot, a joint, and a pawl; a shaft journaled in said post having a crank-pin engaging said slot, a telescopic shaft and universal-joint couplings to transmit motion from the machine proper to said shaft, substantially as described.

In testimony whereof I affix my signature in presence of two witnesses.

ORRIN B. BOLTON.

Witnesses:
LEWIS E. FLANDERS,
IRENE A. GALUSHA.